(No Model.)
W. B. VANSIZE.
RAILWAY SIGNAL.
No. 544,802. Patented Aug. 20, 1895.
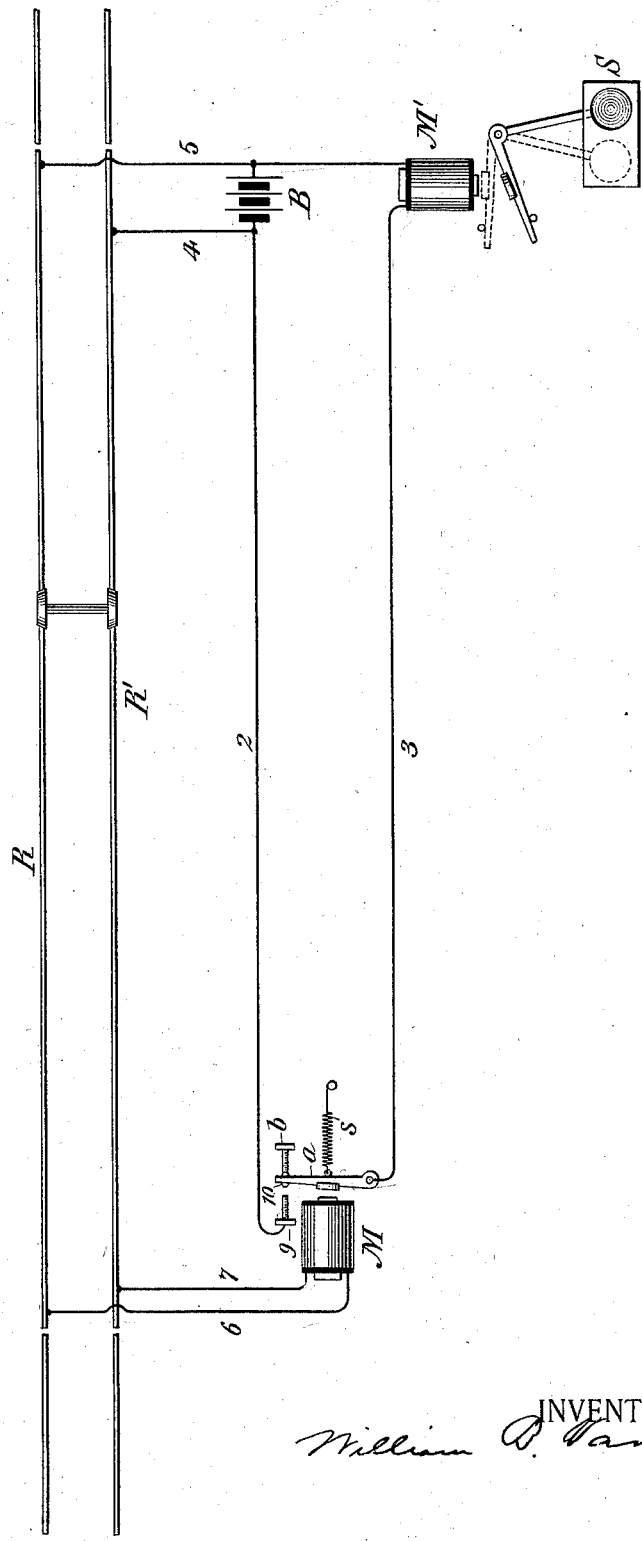
WITNESSES:
C. E. Ashley
W. S. Place
INVENTOR:
William B. Vansize

UNITED STATES PATENT OFFICE.

WILLIAM B. VANSIZE, OF NEW YORK, N. Y.

RAILWAY-SIGNAL.

SPECIFICATION forming part of Letters Patent No. 544,802, dated August 20, 1895.

Application filed July 18, 1895. Serial No. 556,378. (No model.)

*To all whom it may concern:*

Be it known that I, WILLIAM B. VANSIZE, a citizen of the United States, and a resident of New York, in the county and State of New York, have made certain new and useful Improvements in Railway-Signals, of which the following is a specification.

My invention relates to railway-signals operated by electricity of that class in which the track is divided into blocks or sections.

Prior to my invention it was old and well-known to include the rails of the track in circuit in series, placing an electromagnet between the rails at one end of the section and a relay-magnet between the rails at the opposite end of the section. A signal-circuit was arranged parallel to this track-section, and a signal-controlling magnet was included in said circuit at the battery end and the break-points of the relay magnet were placed in said circuit at the opposite end. From this arrangement it resulted that if a rail was broken the relay operated to open the signal-circuit to display a danger-signal. When a car or vehicle passed onto the track-section, the battery was cut off from the relay-magnet, which operated, as before described, to display a danger-signal. This arrangement of circuits is probably the best and most popular now known; but it often happens that atmospheric electricity discharges into the signal-circuit, fuses the break-points controlled by the relay, and the signal-circuit is thus rendered inoperative, while the signal continually indicates "safety."

The object of my invention is to obviate the effects of atmospheric electricity in the signal-circuit and to guard against the mishaps likely to follow the failure of the relay to operate for any reason whatsoever.

I provide a track-circuit in which the rails are included in series. A battery is connected between the rails at one end, and the coils of a relay-magnet are included between the rails at the opposite end. A signal-circuit consisting of an insulated direct conductor and a suitable return-conductor is arranged substantially parallel and coextensive with the track-circuit. At one end of the signal-section I place a signal, either audible or visible. A magnet to control said signal is placed in proximity thereto and its coils are included in the signal-circuit. The break-points of the relay are included in series in the signal-circuit at the opposite end of the signal-section. The battery which supplies the track-circuit is included in the signal-circuit, so that there is but a single main battery, which is common to both track-circuit and signal-circuit. When normal conditions prevail both circuits are closed and the signal stands at "safety." If a rail is broken or displaced the track-circuit is opened, the relay-armature falls back, breaking the signal circuit, and the signal-magnet controls the signal to indicate "danger." When a car or vehicle enters the track-section, the battery is short-circuited and the relay-armature falls back and opens the signal-circuit; but as the battery is short-circuited and as it is common to both circuits the signal-circuit is also deprived of current and the signal-magnet controls the signal to indicate "danger," and it does this irrespective of whether or not the relay-points are in normal operative condition. To secure this result the relay-magnet and the signal-controlling magnet are of comparatively high resistance and substantially equal in that respect.

The accompanying drawing illustrates my invention.

R and R' are the two rails of a track signal-section, which may be a half-mile long, more or less. They are included in circuit in series. Between the rails at one end is the main battery B, one pole being connected to the rail R by the conductor 5, the other pole being connected to the rail R' by the conductor 4. The relay-magnet coil M is included between the rails at the opposite end of the signal-section, one terminal being connected to the rail R by the conductor 6, the other terminal being connected to the rail R' by the conductor 7. The signal-circuit is arranged substantially parallel and coextensive with the rail-circuit and is composed of the direct and return conductors 2 and 3.

M' is a magnet controlling the operation of the signal S located at one end of the signal-section. In the signal-circuit is also included the main battery B, and at the opposite end of the signal-section a circuit-breaker 9 10 is included in the signal-circuit in series. This circuit-breaker is operated by the relay-magnet M. The contact-point 10 is fixed upon the end of the armature-bar $a$. $b$ is a backstop for the armature-bar, and $s$ is a retracting-spring therefor.

When the signal-section is in its normal condition, the signal S is invisible and indicates "safety." If the continuity of either rail R or R' becomes interrupted the relay-magnet M releases its circuit-breaker, the signal-circuit is broken, and magnet M' controls the signal S to indicate "danger." If a car or train enters upon the rail-section R R' the battery B is short-circuited, the magnet M releases its circuit-breaker, and the circuit 2 3 is broken at 9 10. The short circuit is formed *via* the rail R, wheels and axle of the vehicle rail R', conductor 4, battery B, and conductor 5; but this short-circuiting of the battery B withdraws current from the signal-circuit 2 3 and the magnet M' is de-energized, operating to control the signal S to indicate "danger," and this whether or not the circuit-breaker 9 10 has operated or not, so that if it should occur at any time that the points 9 10 remain in contact or if they have been fused together by atmospheric electricity coming in on the conductors 2 or 3 the signal S will always indicate "danger" when a car is on the signal-section, while the relay-magnet M is free, under normal conditions, to cause an indication of a break or interruption in the track-circuit.

I am aware of the United States Patent to J. P. Buchanan, No. 497,489, dated May 16, 1893, and I do not claim anything therein shown, described, or claimed.

What I claim, and desire to secure by Letters Patent, is—

1. In a railway signal the combination of a signal circuit and a rail circuit substantially coextensive and parallel, a main battery at one end of the signal section included in both circuits, a signal controlling magnet in the signal circuit at one end of the section, a circuit breaker in said circuit at the opposite end of the section, a relay magnet controlling said circuit breaker included in the rail circuit and insulated rail sections connected in said rail circuit in series upon opposite sides of said battery, substantially as described.

2. In a railway signal the combination of a battery common to the rail circuit and the signal circuit, said rail circuit including the coils of a relay magnet located at the end of the track section remote from the battery, two insulated parallel rail sections connected to said circuit upon opposite sides of said battery, said signal circuit being parallel to said track circuit and including a circuit breaker operated by said relay magnet and a signal controlling magnet located at the end of the track section remote from the relay magnet whereby the passage of a car upon the rail section opens the signal circuit and short circuits the battery in both circuits, substantially as described.

3. In a railway signal the combination of a signal circuit and a rail circuit, a single main battery included in both circuits, a signal controlling magnet in the signal circuit at one end of the section, a circuit breaker in said circuit at the opposite end of the section, a relay magnet controlling said circuit breaker included in the rail circuit and insulated rail sections connected upon opposite sides of said battery, substantially as described.

WILLIAM B. VANSIZE.

Witnesses:
 THEODORE L. CUYLER, Jr.,
 W. S. PLACE.